UNITED STATES PATENT OFFICE.

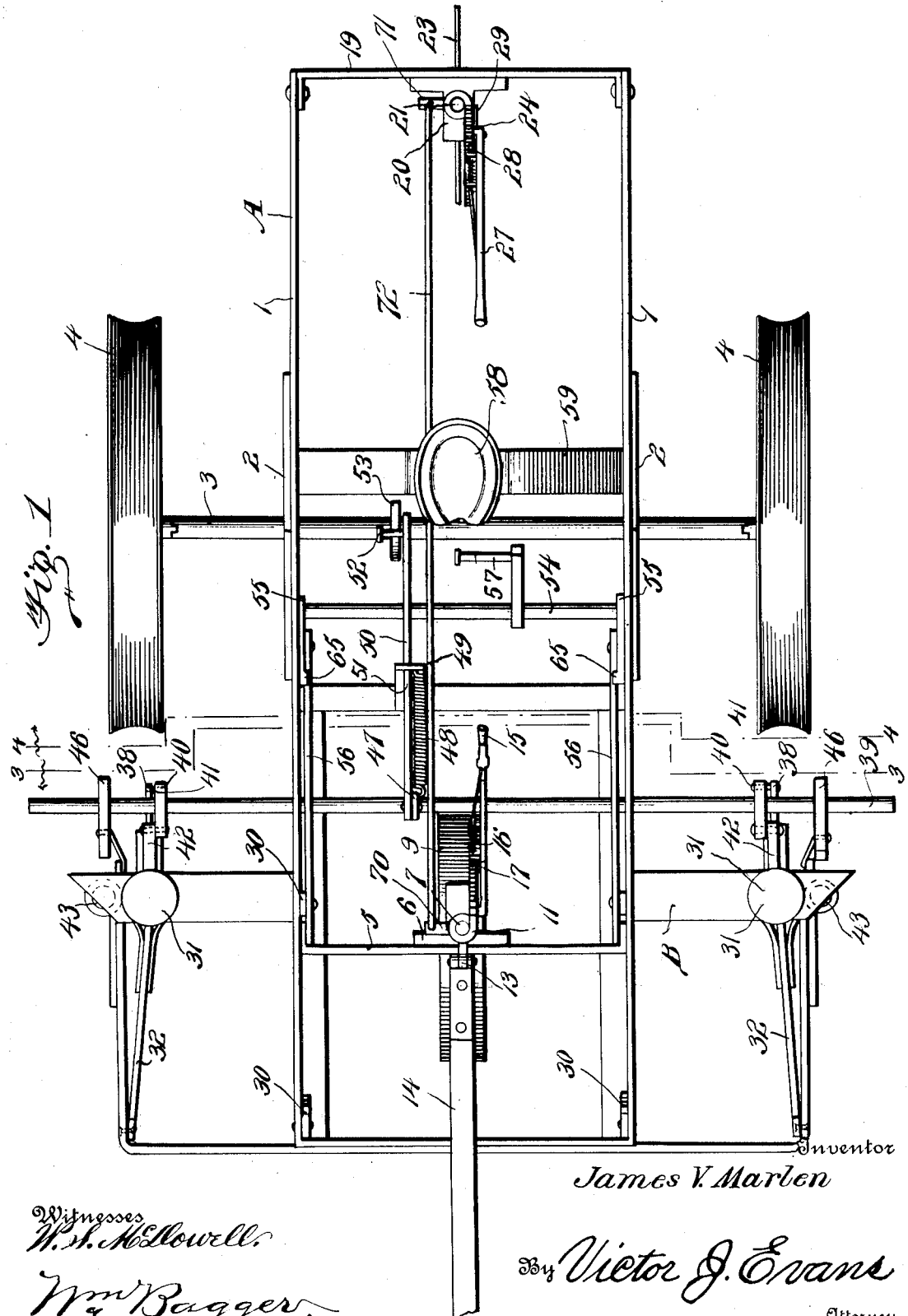

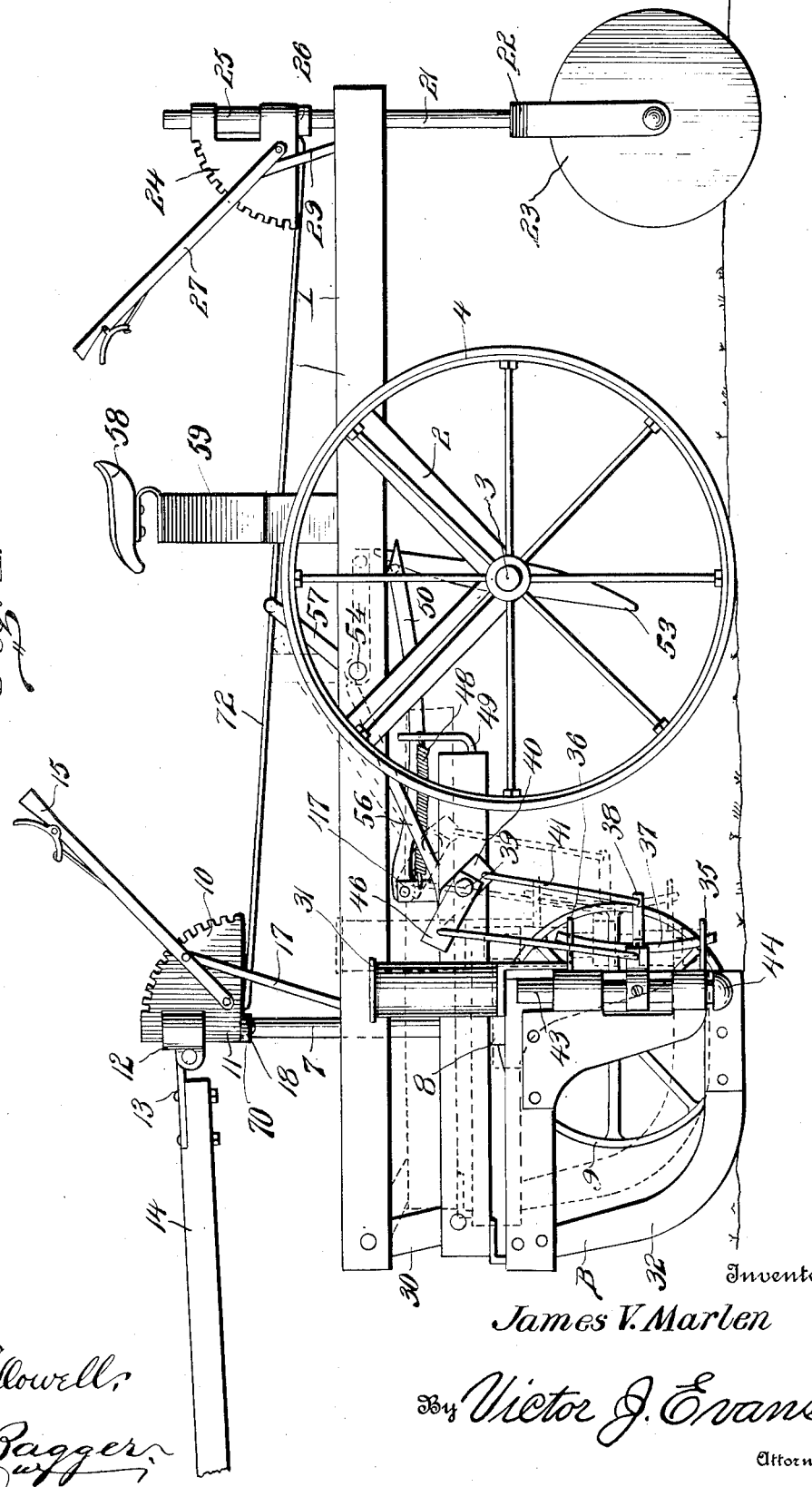

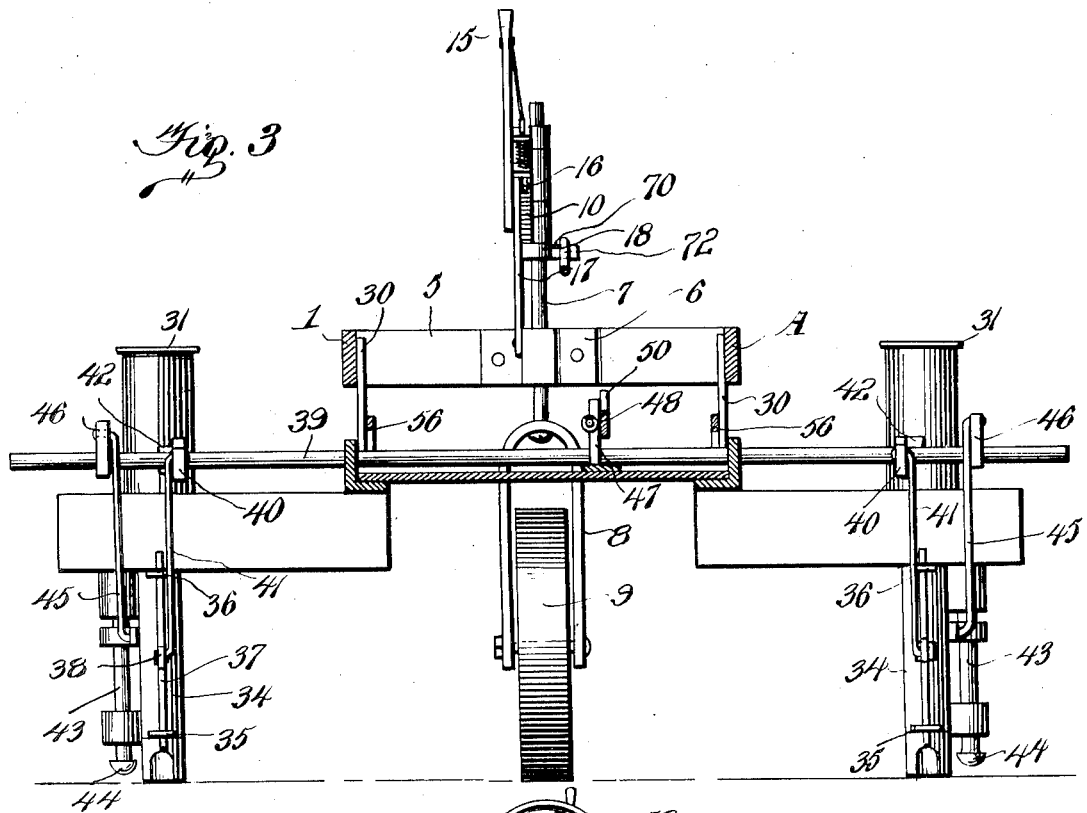
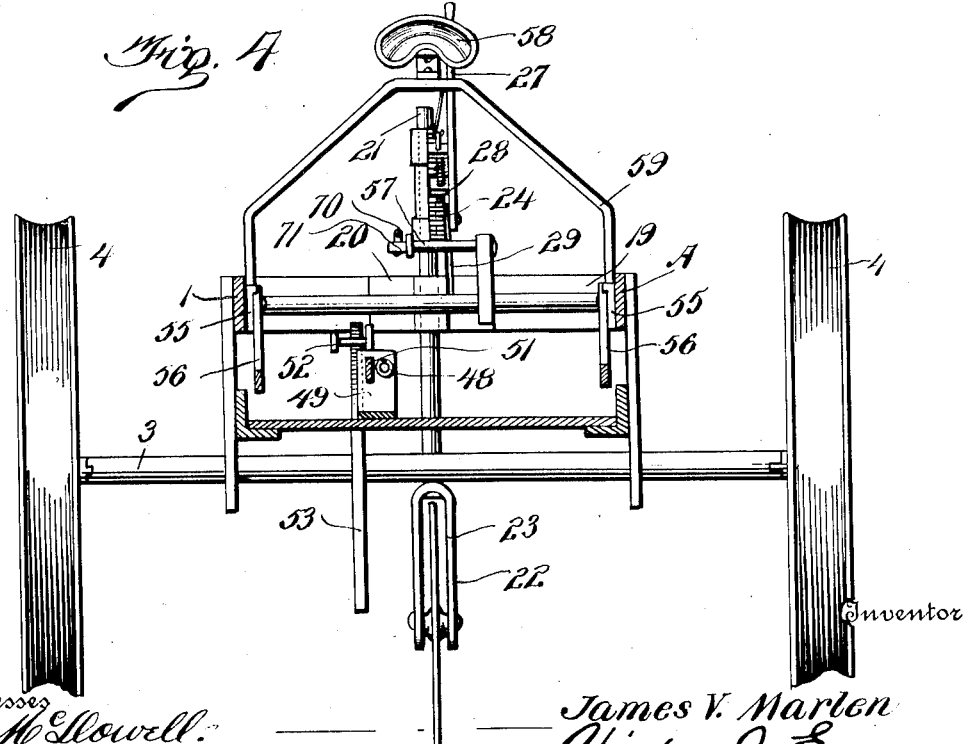

JAMES V. MARLEN, OF MODOC, ILLINOIS.

CORN-PLANTER.

1,113,802.  Specification of Letters Patent.  Patented Oct. 13, 1914.

Application filed August 4, 1911. Serial No. 642,287.

*To all whom it may concern:*

Be it known that I, JAMES V. MARLEN, a citizen of the United States, residing at Modoc, in the county of Randolph and State of Illinois, have invented new and useful Improvements in Corn-Planters, of which the following is a specification.

This invention relates to corn planters, and the principal object of the invention is to produce a check row corn planter of simple and improved construction which may be operated efficiently on side hills and which will plant and check the rows evenly and accurately under all circumstances.

A further object of the invention is to provide a check row corn planter with an earth engaging guide wheel to prevent lateral or side motion.

Still further objects of the invention are to simplify and improve the general construction and operation of a machine of the class described.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a top plan view of a corn planter constructed in accordance with the invention. Fig. 2 is a side elevation of the same. Fig. 3 is a vertical transverse sectional view taken on the line 3—3 in Fig. 1. Fig. 4 is a vertical transverse sectional view taken on the line 4—4 in Fig. 1.

Corresponding parts in the several figures are denoted by like characters of reference.

The frame A of the improved corn planter which is mainly of rectangular shape includes side pieces 1, 1 having depending V-shaped brackets 2, 2 affording bearings for an axle 3 carrying the transporting wheels 4, 4. The side members 1, 1 are connected near their front ends by a cross bar 5 supporting a socket 6 through which is guided a vertical shaft 7 having at its lower end a yoke 8 in which a supporting wheel 9 is journaled. A segment rack 10 is provided with ears or lugs 11, whereby it is journaled on the shaft 7 adjacent to the upper end of the latter, and secured upon said shaft between the ears or lugs 11 is a sleeve 12 having a forwardly extending hinged arm 13 with which the tongue 14 is connected. Fulcrumed upon the rack segment is a lever 15 having a spring actuated stop member 16 adapted to engage said rack segment, and the lever 15 is connected by means of a link 17 with the socket member 6. The rack segment is prevented from moving longitudinally upon the shaft 7 by the stationary sleeve 12 and also by a collar 18. It will be seen that by actuating the hand lever 15, the link 17 will serve to raise or lower the front portion of the frame relatively to the wheel carrying shaft, the parts being supported in adjusted position by the stop member 16 engaging the segment rack 10.

The rear cross bar 19 of the frame has a socket 20 through which is guided a shaft 21 carrying at its lower end a yoke 22 in which an earth engaging sharp-edged disk 23 is supported for rotation. The shaft 21 carries a rack segment 24 which is secured against longitudinal movement upon said shaft by a sleeve 25 and a collar 26. Fulcrumed upon the rack segment 24 is a hand lever 27 having a stop member 28, and said lever is connected by a link 29 with the socket member 20. It will be seen that by manipulating the lever 27, the shaft 21 may be raised or lowered through the socket 20 for the purpose of lifting the disk 23 or lowering said disk to positively engage the ground to any desired depth, said disk being sharp-edged, as stated, so that it will readily cut into the soil to the depth of four or six inches or as far as may be necessary in order to prevent any side motion of the planter frame. In side hill work, this earth engaging disk has been found extremely efficient in preventing the planter from leaving the true line of progress. While turning the machine or in transporting the machine from one place to another, the lever 27 is manipulated to lift the disk from the ground so as not to interfere with the turning of the machine and to keep it from cutting into the road while the machine is being transported from place to place.

The runner frame B is connected with the side members 1 of the main frame A by means of links 30 that enable the runner frame to move in parallel relation to the main frame, thus enabling said runner frame to be lifted bodily from the ground, as will be seen in dotted lines in Fig. 2 of the drawings. The runner frame supports the seed boxes or hoppers 31, the runners or furrow openers 32 and the seed dropping mechanism, which includes seed ducts or tubes 34 having foot valves 35 and top valves 36, said foot valves and top valves being operatively connected with the arms of levers 37 fulcrumed upon the tubes or ducts 34. The lever 37 has a rearwardly extending arm 38. A rock shaft 39, which is supported in the runner frame, is provided with an arm 40 connected by a link 41 with the lever arm 38. Another arm 42 extends from said rock shaft and is operatively connected with a seed slide (not shown). Supported in bearings adjacent to each seed tube 34 is a vertically movable rod 43 having at its lower end an earth-engaging shoe 44, said rod being connected by a link 45 with an arm 46 extending from the rock shaft 39. Thus, it will be seen that by oscillating the rock shaft, the seed dropping mechanism will be actuated to deposit a charge of seed, while at the same time the rods 43 will be depressed to engage the ground, thereby marking the location of the hill, and at the same time slightly lifting the heel ends of the runners so as to prevent any possibility of the seed being dragged from the proper place of deposit. The seed charges after being deposited in the ground are covered in the usual manner by the action of the supporting wheels 4 which follow behind and which operate to cover the seed.

The rock shaft 39 is provided intermediate its ends with an upwardly extending arm 47 which is connected by a spring 48 with an upright 49, whereby the rock shaft is actuated in one direction. To oscillate the rock shaft against the tension of the spring for the purpose of actuating the seed dropping mechanism and allied parts, various means may be employed. In the present instance, the arm 47 of the rock shaft is provided with a pivoted rearwardly extending link member 50 guided through a slot 51 in the upper end of the upright 49 and having a pedal 52 lying in the path of tappet arms 53 that extend from the axle 3 so that by the rotation of said axle the tappet arms will strike the pedal 52, thereby forcing the link 50 forward against the tension of the spring 48 which connects the arm 47 of the rock shaft with the upright 49, thus rocking the shaft and actuating the seed dropping mechanism. As each tappet arm 53 passes out of engagement with the pedal 52, the parts are restored to initial position by the action of the spring 48. It will be understood that any desired number of tappet arms may be provided, thus enabling the seed dropping mechanism to be operated at longer or shorter intervals, as may be desired. A rock shaft 54 which is supported for oscillation in the side members of the main frame A, is provided with arms 55, said arms being connected by links 56 with the runner frame B. The rock shaft 54 is also provided with a foot piece or treadle 57 which is disposed in convenient proximity to the driver or operator whose seat 58 is mounted upon an arch 59 rising from the main frame. By placing his foot upon the treadle 57, the driver may oscillate the rock shaft 54, thus lifting the runner frame bodily to the position shown in dotted lines in Fig. 2, thus disengaging the runners from the ground and supporting the parts in convenient position for transportation. It will be observed that when the runner frame is thus lifted, the pedal 52 will be moved out of the path of the tappet arms. Means may be used for maintaining the runner frame in raised position, but such means have not been shown, being well known and understood.

From the foregoing description, taken in connection with the drawings hereto annexed, the operation and advantages of this invention will be readily understood. By manipulating the lever 15, the forward part of the main frame carrying the runner frame may be raised or lowered, and the runner frame which engages the ground by gravity may thus be made to engage the ground to any desired depth. By means of the lever 27, the rear disk 23 may be raised or lowered, and when in a ground engaging position it will prevent lateral motion of the planter frame. The weight of the front portion of the main frame, as well as the entire weight of the runner frame when the latter is lifted, is supported by the wheel carrying shaft 7, and no portion of this weight will rest upon the shoulders of the draft animals, the tongue being connected as described with the said wheel carrying shaft 7. The seed dropping mechanism which may be of the simple conventional construction herein described, is adapted to be actuated by the rock shaft 39, which latter may be actuated by the tappet arms upon the axle of the main frame, and the operator has it in his power by simple pressure upon the foot lever or treadle 57 to lift the runner frame from the ground and to throw the machine out of operation at a moment's notice. In turning the machine, the wheel carrying shaft 7 will rock in the bearings of the rack segment 10, the position of which does not change. The shafts 7 and 21 are provided with radially extending arms 70, 71 which are connected together by means of a rod 72 extending longitudinally above the frame of the machine.

It will be seen that by this simple provision when the steering shaft 7 is turned or rocked in either direction by means of the tongue which is connected therewith, the shaft 21 will be rocked in the same direction, thus causing the disk 23 to remain in approximately parallel relation to the steering wheel 9. In hillside planting it sometimes happens that the planter will slide or gravitate down the hillside, and this tendency on the part of the machine may be entirely overcome and counteracted by the mechanism just described, whereby the steering wheel 9 and the ground engaging disk 23 will serve as a rudder to guide the machine upward upon the hillside sufficiently to counteract the downward tendency, thereby maintaining the machine in proper position for effective work.

The arms 55 of the rock shaft 54 are preferably provided with laterally extending lugs 65 adapted to engage the upper edges of the links 56 when the runner frame is in ground engaging position, thus holding the parts from dropping too low.

It will be seen that this machine will check both ways without the use of a wire, it being extremely easy to locate the starting point at either end of the row, owing to the depressions made in the ground by the shoes 44 of the rods or hill-markers 43, whereby the hills may be precisely located with perfect ease and certainty.

Having thus described the invention, what is claimed as new, is:—

A planter comprising a frame, journaled wheels supporting the intermediate portion of the frame, a wheel pivotally mounted at the forward part of the frame and adapted to turn horizontally, a soil engaging member journaled at the rear part of the frame and pivoted to turn horizontally, the last mentioned wheel and the soil engaging member being located at the opposite sides of the first mentioned wheels, means connecting the last mentioned wheel and the soil engaging member to cause them to turn horizontally and simultaneously in the same direction and means for adjusting the soil engaging member vertically with relation to the frame.

In testimony whereof I affix my signature in presence of two witnesses.

JAMES V. MARLEN.

Witnesses:
U. S. THOMPSON,
DELLA CHURCH.